(12) United States Patent
Hayashi

(10) Patent No.: US 11,731,217 B2
(45) Date of Patent: Aug. 22, 2023

(54) METHOD AND DEVICE FOR MANUFACTURING JOINING APPARATUS

(71) Applicant: ORIGIN COMPANY, LIMITED, Saitama (JP)

(72) Inventor: Toshihiko Hayashi, Saitama (JP)

(73) Assignee: ORIGIN COMPANY, LIMITED, Saitama (JP)

(*) Notice: Subject to any disclaimer, the term of this patent is extended or adjusted under 35 U.S.C. 154(b) by 0 days.

(21) Appl. No.: 17/782,618

(22) PCT Filed: Mar. 30, 2021

(86) PCT No.: PCT/JP2021/013726
§ 371 (c)(1),
(2) Date: Jun. 3, 2022

(87) PCT Pub. No.: WO2021/246036
PCT Pub. Date: Dec. 9, 2021

(65) Prior Publication Data
US 2023/0009387 A1    Jan. 12, 2023

(30) Foreign Application Priority Data

Jun. 2, 2020   (JP) .............................. JP2020-096230

(51) Int. Cl.
*B23K 33/00*   (2006.01)
*B23K 11/02*   (2006.01)
(Continued)

(52) U.S. Cl.
CPC ............ *B23K 33/006* (2013.01); *B23K 11/02* (2013.01); *B23K 11/3009* (2013.01); *B23K 11/36* (2013.01)

(58) Field of Classification Search
CPC . B23K 11/115; B23K 11/3018; B23K 33/006; B23K 11/02; B23K 11/3009; B23K 11/36
(Continued)

(56) References Cited

U.S. PATENT DOCUMENTS

| 10,035,221 B2 * | 7/2018 | Kadoya ................ B23K 33/006 |
| 2011/0104511 A1 | 5/2011 | Okumura et al. |
| 2015/0151377 A1 * | 6/2015 | Ananthanarayanan ...................... B23K 9/285  219/137 R |

FOREIGN PATENT DOCUMENTS

| JP | 2004-017048 A | 1/2004 |
| JP | 2005-000972 A | 1/2005 |

(Continued)

OTHER PUBLICATIONS

Office Action dated Jul. 29, 2022 for Chinese Patent Application No. 202180005229.2; with English translation, 13 pages.
(Continued)

*Primary Examiner* — Dana Ross
*Assistant Examiner* — James F Sims, III
(74) *Attorney, Agent, or Firm* — Squire Patton Boggs (US) LLP

(57) ABSTRACT

A method of manufacturing a joining apparatus includes: providing a first metal member including an opening and a joint structure; providing a second metal member including an outer circumferential wall capable of contacting an inner circumferential wall that surrounds the opening and a joined structure, to which the joint structure is joined; causing the first metal member and the second metal member to move relative to each other, bringing one of a first joining section, which is configured by the inner circumferential wall and the outer circumferential wall, and a second joining section, which is configured by the joint structure and the joined structure, into contact, and separating the other joining
(Continued)

section; starting energization between the first and the second metal members; bringing components of the other joining section into contact with each other; and joining the first and second joining sections by the relative movement and the energization.

5 Claims, 13 Drawing Sheets

(51) Int. Cl.
  *B23K 11/30* (2006.01)
  *B23K 11/36* (2006.01)
(58) Field of Classification Search
  USPC .................................................. 219/104, 119
  See application file for complete search history.

(56) References Cited

FOREIGN PATENT DOCUMENTS

| JP | 2006-263809 A | 10/2006 |
| JP | 2011-098358 A | 5/2011 |
| JP | 2011-245512 A | 12/2011 |
| JP | 2016-209926 A | 12/2016 |
| JP | 2017-064773 A | 4/2017 |

OTHER PUBLICATIONS

International Search Report dated Jun. 22, 2021 for International Application No. PCT/JP2021/013726, with translation, 5 pages.
Notice of Reasons for Refusal dated Oct. 27, 2020 for Japanese Patent Application No. 2020-96230, with English translation, 8 pages.

* cited by examiner

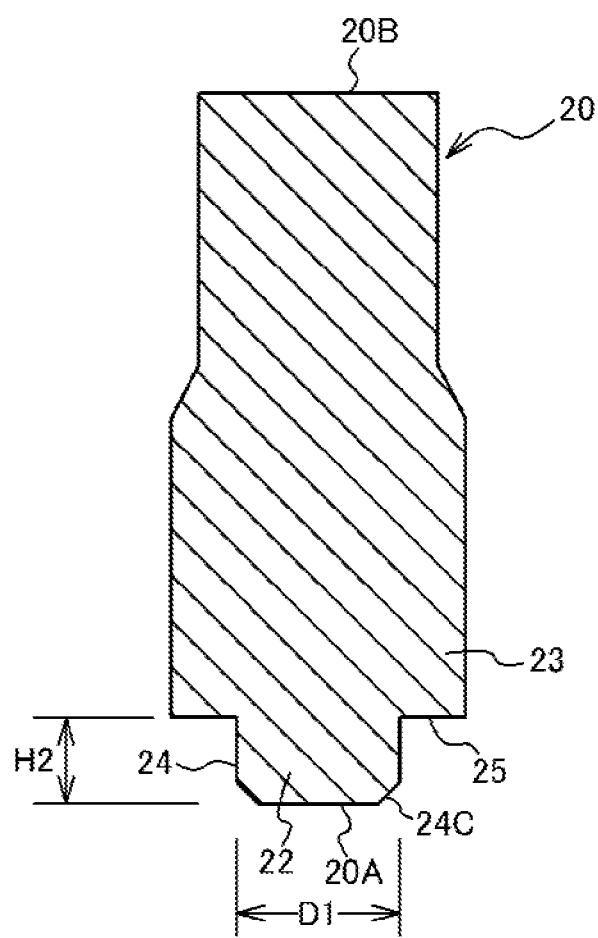

METHOD AND DEVICE FOR MANUFACTURING JOINING APPARATUS

CROSS-REFERENCE

This application is a National Stage filing under 35 U.S.C. § 371 of International Patent Application No. PCT/JP2021/013726, filed Mar. 30, 2021, which claims the benefit of and priority to Japanese Patent Application No. 2020-096230, filed Jun. 2, 2020, the contents of all of which are hereby incorporated by reference in their entireties for all purposes.

TECHNICAL FIELD

The present disclosure relates to a method and a device for manufacturing a joining apparatus.

BACKGROUND ART

As a method for manufacturing a component that is formed by joining plural metal members such as a clutch component and a differential gear of an automobile, a so-called Ring Mash® joining method (hereinafter simply referred to as "Ring Mash joining") has been known. In the Ring Mash joining, a current is applied while a member is press-inserted into an opening provided in another member, so as to soften both of the members by generated Joule heat and cause a plastic flow thereof. As a result, both of the members are joined in a solid state. Compared to a welding method such as arc welding, this Ring Mash joining has a characteristic of not causing problems such as segregation of carbides due to the melted metal member and solidification cracking due to the heat, and also has a characteristic of a short required time for joining.

For example, a method for manufacturing a joining apparatus is disclosed in Japanese Patent Application Publication No. 2004-017048. In the method for manufacturing a joining apparatus, a joined object having a circular or rectangular hollow section is joined to another joined object having a shaft shape and joined to this hollow section by the above-described Ring Mash joining.

SUMMARY OF INVENTION

Technical Problem

However, in Japanese Patent Application Publication No. 2004-017048, the joining apparatus has only one ring-shaped joining site. Accordingly, in the case where bending stress is generated to the joining apparatus in a thrust direction, such stress is concentrated on this single joining site and possibly damages the joining apparatus. Such bending stress is likely to be generated when at least one of the welded objects is long, like the other welded object of the joining apparatus disclosed in Japanese Patent Application Publication No. 2004-017048.

The present disclosure has been made in view of the above-described problem, and therefore has a purpose of providing a method and a device for manufacturing a joining apparatus in order to obtain a joining apparatus with significant strength against bending stress.

Solution to Problem

In order to achieve the above purpose, a method of manufacturing a joining apparatus 1 according to a first aspect of the present disclosure includes, for example, as illustrated in FIG. 1 to FIG. 5: a step S101 of providing a first metal member 10 including an opening 11 and a joint structure 15; a step 102 of providing a second metal member 20 including: an outer circumferential wall 24 capable of contacting an inner circumferential wall 14 that surrounds the opening 11 of the first metal member 10; and a joined structure 25 to which the joint structure 15 is joined, at least one of the joint structure 15 and the joined structure 25 being configured by one or plural projections 15; a step 103 of causing the first metal member 10 and the second metal member 20 to move relative to each other in a direction P of inserting the second metal member 20 into the opening 11 of the first metal member 10, bringing components of one joining section of a first joining section 4, which is configured by first components including the inner circumferential wall 14 and the outer circumferential wall 24, or a second joining section 5, which is configured by second components including the joint structure 15 and the joined structure 25, into contact with each other, and separating the components of another joining section of the first joining section or the second joining section by a specified distance; a step 104 of starting energization between the first metal member 10 and the second metal member 20; a step 105 of continuing the relative movement between the first metal member 10 and the second metal member 20 to bring the components of the other joining section into contact with each other; and a step 106 of joining the first joining section 4 and joining the second joining section 5 by the relative movement and the energization.

With such a configuration, the two metal members are joined at two joining sites. In this way, compared to a case where the two metal members are joined at the single joining site, strength thereof can be increased. In addition, at the time of joining at the two joining sites in a series of steps, timing to start joining is actively varied. In this way, displacement amounts of the joining sections can vary, and generation of a burr and a spatter (dust) from the metal member during joining can be suppressed.

In the method of manufacturing the joining apparatus 1 according to a second aspect of the present disclosure, for example, as illustrated in FIG. 4, the joining in the method for manufacturing the joining apparatus 1 according to the first aspect of the present disclosure is solid phase joining.

With such a configuration, when the solid phase joining, that is, a joining method not substantially associated with melting of the metal member is adopted as the joining method, compared to the well-known joining method such as arc welding, it is possible to reduce energy required for joining.

In a method of manufacturing the joining apparatus 1 according to a third aspect of the present disclosure, for example, as illustrated in FIG. 4, FIG. 7, and FIG. 8, in the method for manufacturing the joining apparatus 1 according to the first or second aspect of the present disclosure, the first joining sections 4, 4C, 4D have lap allowances L1, L3, L6 of a specified length in which the inner circumferential walls 14, 44, 64 and the outer circumferential walls 24, 54, 74 respectively overlap each other in a direction perpendicular to the direction of inserting P, and the second joining sections 5, 5C, 5D have joint widths L2, L4, L5 of a specified length which extend in the direction perpendicular to the direction of inserting P in a state in which the joint structures 15, 55, 65 and the joined structures 25, 45, 75 are respectively joined, and the lap allowances L1, L3 or the joint width L5 of the one joining section is longer than the joint widths L2, L4, L5 or the lap allowance L6 of the other joining section.

With such a configuration, the lap allowance or the joint width of the one joining section, in which a joined surface contacts first, and joining of which is started first, is set to be longer than the lap allowance or the joint width of the other joining section, joining of which is started later. Thus, joint strength of each of the joining sections can be adjusted. In addition, the joint width or the lap allowance of the other joining section, joining of which is started later, is relatively reduced. Accordingly, when this portion is joined, it is possible to suppress generation of unnecessarily high Joule heat in the one joining section, joining of which is started early, and thus to suppress generation of the spatter. Therefore, both of the joining sections in the manufactured joining apparatus can be in a favorable joint state.

In the method of manufacturing the joining apparatus 1 according to a fourth aspect of the present disclosure, for example, as illustrated in FIG. 4 and FIG. 8, in the method for manufacturing the joining apparatus 1 according to the first to third aspects of the present disclosure, the one joining section is located further toward an inner side in a direction orthogonal to the direction of inserting than the other joining section.

With such a configuration, the other joining section, joining of which is started later, is disposed on the outer side of the one joining section, joining of which is started early. In this way, by using a so-called skin effect that is exerted during energization of the member, a larger amount of the current can flow into the other joining section when the current flows into both of the joining sections. Accordingly, it is possible to raise a temperature of the other joining section to a softening temperature or higher in a short period of time and to suppress supply of the excessive energy to the one joining section. Therefore, both of the joining sections in the manufactured joining apparatus can be in the favorable joint state.

A device 30 for manufacturing a joining apparatus 1 according to a fifth aspect of the present disclosure includes, for example, as illustrated in FIG. 3: a first electrode 31, to which a first metal member 10 including an opening 12 and a joint structure 15 is fixed; a second electrode 32, to which a second metal member 20 is fixed, the second metal member 20 including an outer circumferential wall 24 and a joined structure 25, the outer circumferential wall 24 capable of contacting an inner circumferential wall 14 that surrounds the opening 12 of the first metal member 10, the joint structure 15 being joined to the joined structure 25, and at least one of the joined structure 25 and the joint structure 15 being configured by one or plural projections; and an energization device 34 that supplies a current between the first electrode 10 and the second electrode 32; and a pressure device 35 that causes the first electrode 10 and the second electrode 32 to move relative to each other. The pressure device 35 causes the first metal member 10 and the second metal member 20 to move relative to each other in a direction of inserting the second metal member 20 in the opening 12 of the first metal member 10, and joins the first metal member 10 and the second metal member 20 via a first state of bringing components of one joining section of a first joining section 4, which is configured by first components including the inner circumferential wall 14 and the outer circumferential wall 24, or a second joining section 5, which is configured by second components including the joint structure 15 and the joined structure 25, into contact with each other and separating the components of another joining section of the first joining section or the second joining section by a specified distance G1 and via a second state of bringing the components of the other joining section into contact with each other. The energization device 34 starts supplying the current between the first metal member 10 and the second metal member 20 at a time of the first state.

With such a configuration, the two metal members are joined at two joining sites. In this way, compared to a case where the two metal members are joined at the single joining site, strength thereof can be increased. In addition, at the time of joining at the two joining sites in a series of steps, timing to start joining is actively varied. In this way, displacement amounts of the joining sections can vary, and generation of a burr and a spatter (dust) from the metal member during joining can be suppressed.

Advantageous Effects of Invention

With the above-described structure, it is possible to obtain the joining apparatus with high strength against bending stress by the method and the device for manufacturing a joining apparatus in the present disclosure.

BRIEF DESCRIPTION OF DRAWINGS

FIG. 2 shows a schematic cross-sectional view illustrating an example of a second metal member according to the first embodiment of the present disclosure.

DESCRIPTION OF EMBODIMENTS

The present application is based on Japanese Patent Application No. 2020-096230 filed in Japan on Jun. 2, 2020, the contents of which constitute a part of the contents of the present application.

The present invention will become more fully understood from the detailed description given hereinbelow. Further range of application of the present invention will become clearer from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

A description will hereinafter be made on each mode for carrying out the present disclosure with reference to the drawings. Hereinafter, the scope necessary for the description to achieve the purpose of the present disclosure will be provided schematically, and the scope necessary for the description of the relevant part of the present disclosure will be mainly described. The parts whose description will be omitted will be based on known techniques.

First Embodiment

Figure 1A:
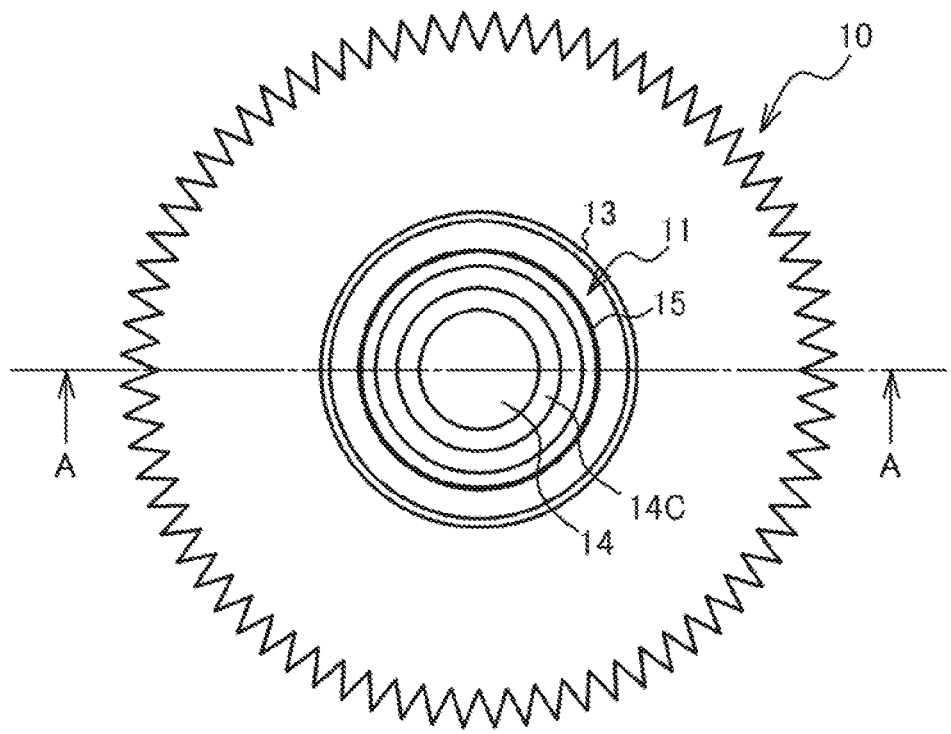
FIG. 1A to FIG. 1C show explanatory views, each of which schematically illustrates an example of a first metal member according to a first embodiment of the present disclosure.
Figure 1B:
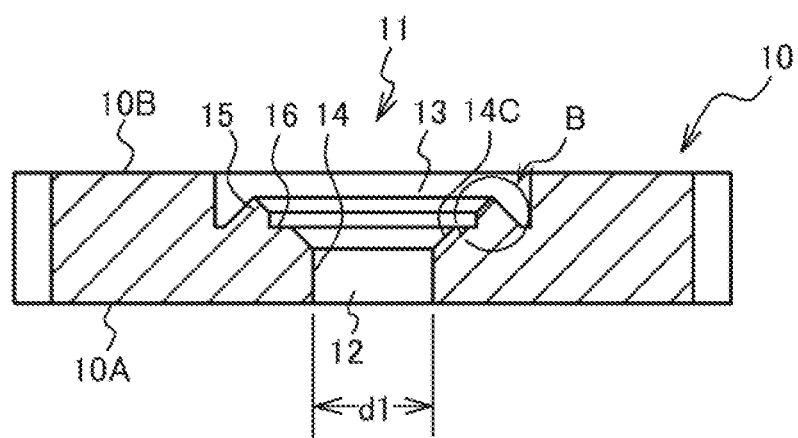
Figure 1C:
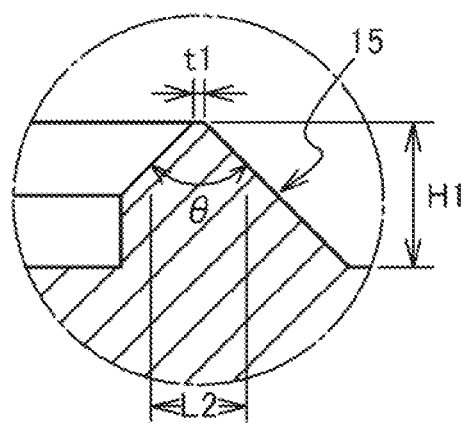

FIG. 1 includes explanatory views illustrating a first metal member 10 according to a first embodiment of the present disclosure, FIG. 1A is a schematic plan view, FIG. 1B is a schematic cross-sectional view that is taken along line A-A in FIG. 1A, and FIG. 1C is an enlarged arrow view of a main section in which section B in FIG. 1B is enlarged. FIG. 2 is a schematic cross-sectional view illustrating a second metal member 20 according to the first embodiment of the present disclosure. As illustrated in FIG. 1 and FIG. 2, in a method for manufacturing a joining apparatus 1 according to this embodiment, the joining apparatus 1 (see FIG. 3 and the like) is manufactured by joining of the first metal member 10 and the second metal member 20 in solid states. In this embodiment, a description will be made by exemplifying a clutch component as the joining apparatus 1, a gear of the clutch component as the first metal member 10, and a shaft of the clutch component as the second metal member 20. The joining apparatus 1 that is manufactured in this embodiment is not limited to the clutch component and can be applied to any of various components, such as a differential mechanism, formed by joining metal members.

As illustrated mainly in FIG. 1A and FIG. 1B, the first metal member 10 may be a substantially disc-shaped gear member that is formed of a metal material such as carbon steel, alloy steel, or cast iron. A circular opening 11 is formed in a central portion of this first metal member 10, and the circular opening 11 penetrates the disc-shaped first metal member 10 in an axial direction thereof (in other words, a thickness direction). The opening 11 is a hole in which the second metal member 20, which will be described below, is inserted, and is configured by coaxially arranging a first opening 12 and a second opening 13 such that the first opening 12 and the second opening 13 continue in the axial direction. That is, this opening 11 can be a circular through hole whose inner diameter changes in the middle.

The first opening 12 can be a columnar opening in a specified height, having an inner diameter of d1 and formed to extend in the axial direction from a perpendicular surface 10A to the axial direction of the first metal member 10. The second opening 13 can be a columnar opening having a larger inner diameter than the inner diameter d1 of the first opening 12 and formed to extend in the axial direction from another perpendicular surface 10B to the axial direction of the first metal member 10. End surfaces of these second opening 13 and first opening 12 communicate with each other via a step 16. A chamfer 14C may be formed in a portion of an inner circumferential wall 14 defining the first opening 12, and the portion continues to the step 16. The description has been made on the opening 11 in this embodiment formed such that the two openings 12, 13 having circular inner circumferential surfaces coaxially continue to each other. However, the shape of each of the openings 12, 13 is not limited to the circular shape, and may have the inner circumferential surface in a polygonal shape or an oval shape, for example. In such a case, a shape of the second metal member 20, which will be described below, is also changed to match the shape of this opening 11.

The ring-shaped step 16 may be formed with a ring-shaped projection 15 as an example of a joint structure. As illustrated in FIG. 1C, this projection 15 has a substantially trapezoidal cross-sectional shape in which a lateral portion thereof is partially cut. A length t1 of an upper side of the projection 15 is set to 0.1 to 0.3 mm (preferably about 0.2 mm), a height H1 of the projection 15 is set to 0.5 to 1.5 mm (preferably about 1.0 mm), and an angle θ defined by lateral sides is set to 60° to 120° (preferably about 90°). A description will be made on the ring-shaped projection 15 according to this embodiment as an example. However, the shape of the projection 15 is not limited thereto and can be, for example, a double-ring shape, a partially separated arc shape, or a land-like shape arranged in plural sites of the ring shape at specified intervals. Similarly, the cross-sectional shape of the ring-shaped projection 15 is not limited to the above-described shape, and can be the polygonal shape or a semicircular shape, for example.

As illustrated in FIG. 2, the second metal member 20 may be a shaft member in a substantially solid round rod shape that is relatively long in an axial direction and is formed of a metal material such as the carbon steel, the alloy steel, or the cast iron. Of ends 20A, 20B in the axial direction of this long second metal member 20, the one end 20A can be a portion that is inserted in the opening 11 of the first metal member 10. The one end 20A may include a large diameter section 23 and a small diameter section 22 that continues to the large diameter section 23. The first metal member 10 and the second metal member 20 may be formed of the same metal material, or may be formed of the different metal materials from each other.

The small diameter section 22 may constitute a columnar projection having an outer diameter D1 and a height H2. The large diameter section 23 can be a columnar portion whose outer diameter is larger than the outer diameter D1 of the small diameter section 22. The small diameter section 22 and the large diameter section 23 continue to each other via a step 25 extending in a direction orthogonal to the axial direction. In an outer circumferential wall 24 defining the small diameter section 22, a portion continuing to a tip surface of the one end 20A may be formed with a chamfer 24C. The step 25 constitutes a ring-shaped surface that extends in the direction orthogonal to the axial direction of the second metal member 20, and constitutes an example of the joined structure, to which the projection 15 of the above-described first metal member 10 is joined. The above-described height H2 of the small-diameter portion 22 is set to be longer than the height H1 of the projection 15 of the first metal member 10. Relative lengths of these heights H1, H2 are set on the basis of joining start timing of the joining site in a joining step, which will be described below. The chamfers 14C, 24C respectively provided to the first metal member 10 and the second metal member 20 abut each other in the joining step, which will be described below, and thereby function to align both of the metal members relative to each other.

Figure 3:
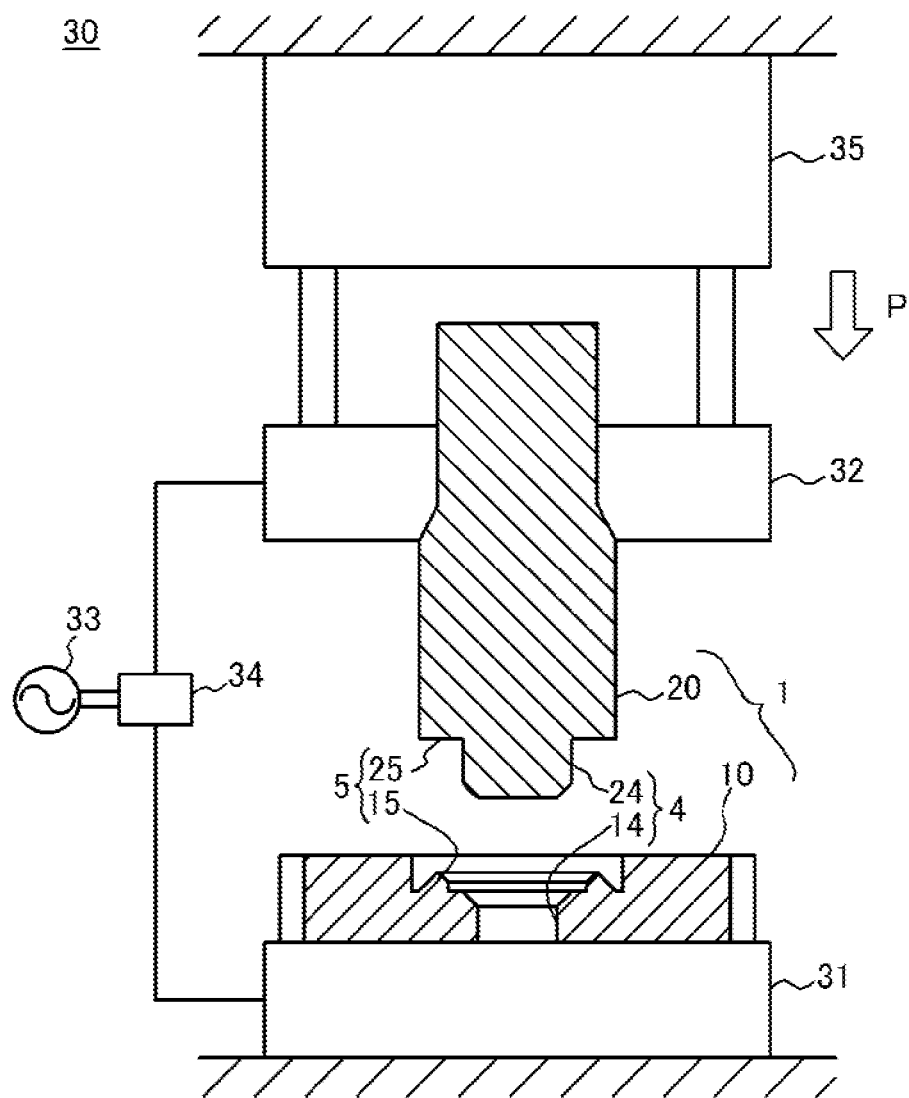
FIG. 3 shows a schematic view illustrating a state where the first and second metal members are attached to an exemplary manufacturing device for a joining apparatus according to the first embodiment of the present disclosure.

FIG. 3 is a schematic view illustrating a state where the first and second metal members 10, 20 are attached to a manufacturing device 30 for the joining apparatus 1 according to the first embodiment of the present disclosure. As illustrated in FIG. 3, the manufacturing device 30 for the joining apparatus 1 according to this embodiment may at least include: a first electrode 31 to which the first metal member 10 is fixed; a second electrode 32 to which the second metal member 20 is fixed; an energization device 34 for supplying a current between the first and second metal members 10, 20; and a pressure device 35 that causes the first and second metal members 10, 20 to move relative to each other in a mutually approaching direction. It is preferred that this manufacturing device 30 for the joining apparatus 1 is accommodated in a processing chamber, which is not illustrated, and surrounding environment thereof is adjusted.

The first electrode 31 can be at least partially formed of a conductive material and have any fixing structure to fix the first metal member 10. Similarly, the second electrode 32 can be at least partially formed of a conductive material and have any fixing structure to fix the second metal member 20. These first and second electrodes 31, 32 are electrically connected to the energization device 34 and thereby constitute electrodes for supplying the current between the first and second metal members 10, 20. Each of the first electrode 31 and the second electrode 32 illustrated in FIG. 3 is exemplified to be entirely formed of the conductive material and function as the electrode. However, the first electrode 31 and the second electrode 32 may each be partially formed of an insulator or the like as long as being able to respectively supply the current to the fixing metal members 10, 20, to which the first electrode 31 and the second electrode 32 are respectively fixed.

For example, the energization device 34 can include a switching device that converts an AC current, which is supplied from an external AC power supply 33 such as a commercial power supply, into a desired pulsed current and that can control energization timing between both of the electrodes 31, 32. By operating the thus-configured energization device 34, the pulsed current is supplied between the first metal member 10, which is fixed to the first electrode 31, and the second metal member 20, which is fixed to the second electrode 32, and mutual contact portions of both of the metal members 10, 20 can be subjected to resistance welding. The pulsed current supplied herein is typically a single pulsed current. This pulsed current has a peak current value of tens to hundreds of thousands of amperes, for example, and has a pulse width of 10 milliseconds to 100 milliseconds. This pulsed current can ensure join between both of the metal members 10, 20. As a specific configuration of the energization device 34, a switching circuit, a semiconductor switch, or the like including a well-known inverter, a well-known capacitor, and the like. However, the configuration of the energization device 34 is not limited thereto. For example, another well-known structure may be adopted as long as the current required to join the first metal member 10 and the second metal member 20 can be supplied between the first electrode 31 and the second electrode 32. A detailed description on each of these structures will not be made herein.

For example, the pressure device 35 is an actuation mechanism that is coupled to the second electrode 32 and operates, together with the second electrode 32, the second metal member 20 fixed to this second electrode 32. More specifically, a well-known pneumatic or hydraulic piston-cylinder mechanism can be adopted. By operating this pressure device 35, the one end 20A of the second metal member 20 can be inserted in the opening 11 of the first metal member 10. The pressure device 35 in this embodiment is merely an example of a device for causing relative movement of the first and second metal members 10, 20, and a specific structure thereof and the metal members as the operating targets are not limited to those described above.

When the joining apparatus 1 is manufactured by using the manufacturing device 30 for a joining apparatus having the above-described configuration, as illustrated in FIG. 3, for example, the first metal member 10 is fixed to the first electrode 31, and the second metal member 20 is fixed to the second electrode 32. Then, the pressure device 35 and the energization device 34 are operated to perform the solid phase joining. Then, the manufactured joining apparatus 1 is formed by being joined at two sites of a first joining section 4 and a second joining section 5. The first joining section 4 is constructed of first components including the inner circumferential wall 14 of the first opening 12 and the outer circumferential wall 24 of the small diameter section 22, and the second joining section 5 is constructed of second components including the projection 15 and the step 25. A series of joining steps will be described below.

A brief description will herein be made on an overview of the Ring Mash joining and projection joining adopted for the method for manufacturing the joining apparatus 1 according to this embodiment. Firstly, as described in Japanese Patent Application Publication No. 2004-017048, the Ring Mash joining typically refers to a joining method for joining an inner circumferential wall of an opening of one metal member having the opening to an outer circumferential wall on an insertion side of the other metal member that is inserted in the opening of the one metal member. In regard to the metal members joined by the Ring Mash joining, the outer circumferential wall on the insertion side of the other metal member is formed to have a slightly larger outer diameter than an inner diameter of the inner circumferential wall of the opening in the one metal member. As a result, a ring-shaped overlap allowance having a specified length is provided between these inner circumferential surface and outer circumferential surface. Then, when an end of the other metal member is pressed in a direction of being inserted in the opening of the one metal member, and both of the metal members are energized, contact surfaces of both of the metal members, that is, the inner circumferential wall of the one metal member and the outer circumferential wall of the other metal member flow plastically in a direction along the contact surface, and thereby constitute a joining section. At this time, due to the Joule heat generated by the energization, both of the metal members are preferably heated at a temperature that is lower than a melting-point temperature and equal to or higher than a softening temperature. In this way, the so-called solid phase joining is performed in which joined surfaces of both of the metal members are not substantially melted (although may temporarily or partially be melted) and solid-state surfaces thereof are joined.

Meanwhile, in the projection joining, typically, a projection (in other words, a protrusion) is formed to one of the joining sections of the two metal members, the other of the joining section is formed to have a flat surface. At the time of joining, the projection is pressed against the flat surface while being energized, and the projection plastically flows in an extending direction of the flat surface to constitute the joining section. Similar to the above-described Ring Mash joining, an energization amount at the time of this joining is set such that, due to the Joule heat generated by the energization, both of the metal members are heated at the temperature that is lower than the melting-point temperature and equal to or higher than the softening temperature. In this way, the so-called solid phase joining is performed in which the joined surfaces of both of the metal members are not substantially melted (although may temporarily or partially be melted) and the solid-state surfaces thereof are joined. In the Ring Mash joining and projection joining described above, the supplied current is the pulsed current, and a supply time thereof is shorter than that in another joining method, such as the arc welding, in which a large current is supplied in a relatively long period. Thus, the Ring Mash joining and the projection joining have an advantage of a relatively small energy amount required for a series of joining.

Figure 4A:
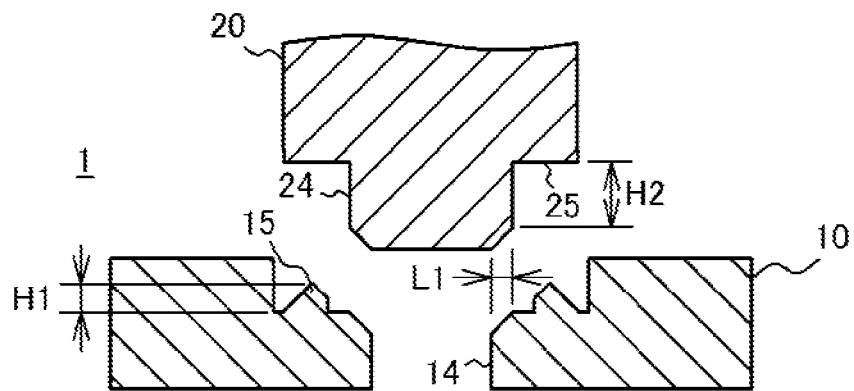
FIG. 4A to FIG. 4D show explanatory views, each of which illustrates a state of main sections of the first and second metal members in a respective step in an example of a method for manufacturing a joining apparatus according to the first embodiment of the present disclosure.

In this embodiment, the Ring Mash joining and the projection joining described above are combined and adopted. For such a reason, as illustrated in FIG. 1, FIG. 2, and FIG. 4A, which will be described below, in the first joining section 4, for which the Ring Mash joining is adopted, the inner diameter d1 of the inner circumferential wall 14 of the first metal member 10 is slightly smaller than the outer diameter D1 of the outer circumferential wall 24 of the second metal member 20. Then, this portion defines an overlap allowance (hereinafter referred to as a "lap allowance") L1 in the first joining section 4, and the lap allowance L1 is perpendicular to a direction of inserting the second metal member 20 in the opening 11 of the first metal member 10. Meanwhile, in the second joining section 5, for which the projection joining is adopted, the projection 15 as the joint structure and the step 25 as a joined structure are arranged to oppose each other in the insertion direction of the second metal member 20 (in other words, the axial direction). Then, when abutting the step S25 and being plastically deformed, this projection 15 constitutes a joint surface in the second joining section 5. This joint surface constitute a ring-shaped surface having a joint width L2 in a specified length in a direction perpendicular to the direction of inserting the second metal member 20 in the opening 11 of the first metal member 10. Each of the lengths of the lap allowance L1 and the joint width L2 can be 0.1 to 0.5 mm, for example. In this embodiment, the lap allowance L1 of the first joining section 4 is set to be larger than the joint width L2 of the second joining section 5. A reason therefor will be described below.

Figure 5:
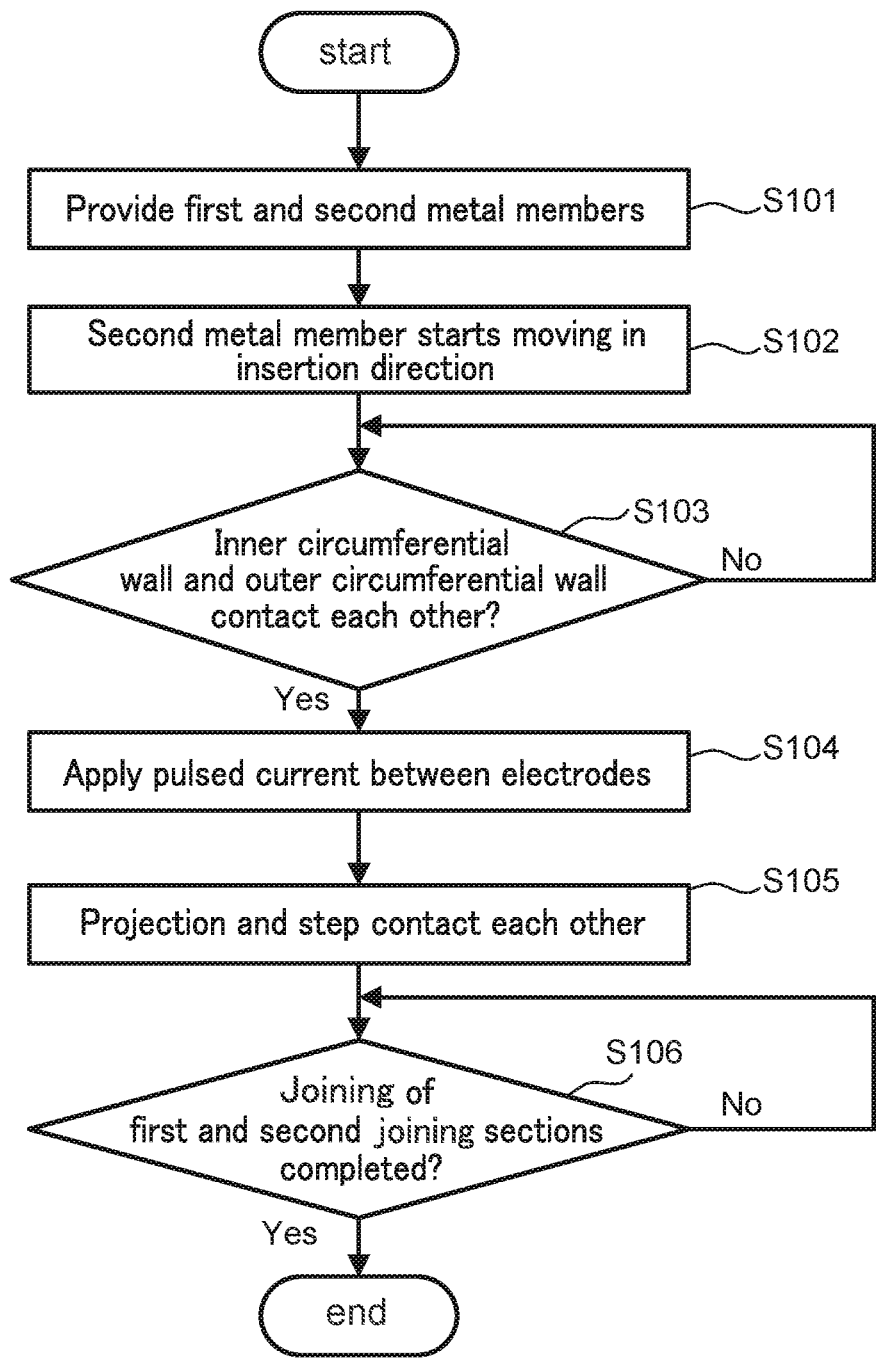
FIG. 5 shows a flowchart illustrating the example of the exemplary method for manufacturing a joining apparatus according to the first embodiment of the present disclosure.
Figure 6A:
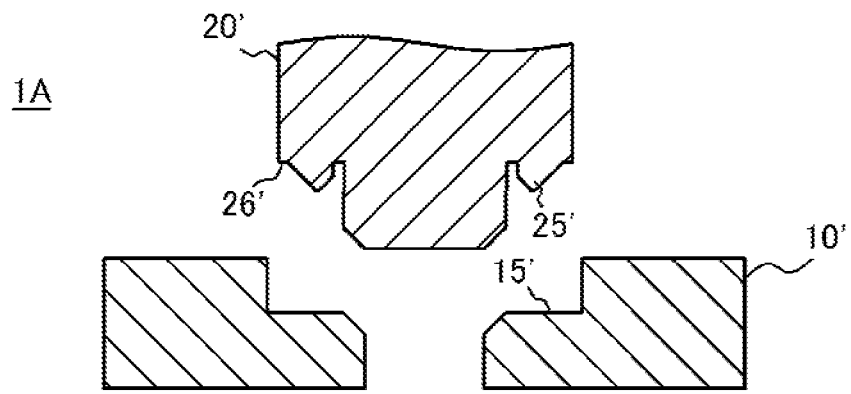
FIG. 6A and FIG. 6B show schematic cross-sectional views, each of which illustrates modified examples of the first and second metal members according to the first embodiment of the present disclosure.
Figure 6B:
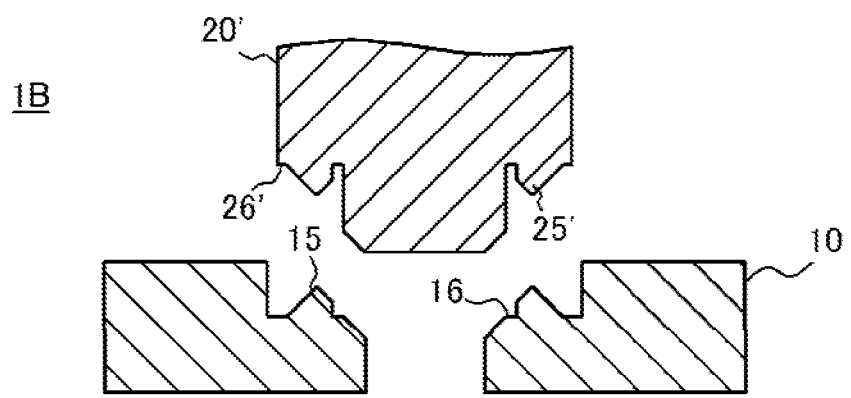

FIG. 4 includes explanatory views, each of which schematically illustrates a state of main sections of the first and second metal members 10, 20 in a respective step in the method for manufacturing the joining apparatus 1 according to the first embodiment of the present disclosure. FIG. 5 is a flowchart illustrating the method for manufacturing the joining apparatus 1 according to the first embodiment of the present disclosure. FIG. 6 includes schematic cross-sectional views, each of which illustrates modified examples of the first and second metal members 10, 20 according to the first embodiment of the present disclosure. A description will hereinafter be made on the method for manufacturing the joining apparatus 1 according to this embodiment mainly with reference to FIG. 4 and FIG. 5. In this method, first, in step S101, as illustrated in FIG. 4A, the first metal member 10 and the second metal member 20 constituting the joining apparatus 1 are provided. The details of the first metal member 10 and the second metal member 20 provided herein are those that have already been described with reference to FIG. 1, FIG. 2, and the like, and such first metal member 10 and second metal member 20 can be adopted. The provided first metal member 10 and second metal member 20 are respectively attached to or supported by the first electrode 31 and the second electrode 32 of the manufacturing device 30 illustrated in FIG. 3.

Figure 4B:
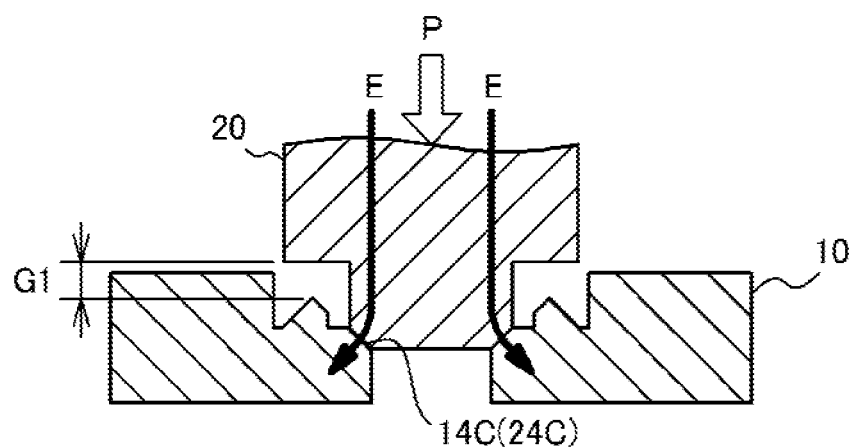

Next, in step S102, the pressure device 35 is actuated to cause the second metal member 20, which is fixed to the second electrode 32, to start moving in a direction to insert the one end 20A thereof in the opening 11 of the first metal member 10 (an arrow P direction illustrated in FIG. 3, FIG. 4B, and the like). This movement continues until a series of joining steps is terminated.

If the above-described movement continues, and the inner circumferential wall 14 of the first metal member 10 and the outer circumferential wall 24 of the second metal member 20, which constitute the first joining section 4, are brought into a first state of contacting each other (Yes in step S103), as illustrated in FIG. 4B, the chamfer 14C of the inner circumferential wall 14 and the chamfer 24C of the outer circumferential wall 24 abut each other, and the first metal member 10 and the second metal member 20 are thereby brought into an electrically connected state. Next, in step S104, the energization device 34 that is connected to the AC power supply 33 is actuated to supply the pulsed current between the first electrode 31 and the second electrode 32. Due to this energization, a current E, which is illustrated in FIG. 4B, flows between the first metal member 10 and the second metal member 20 via the abutting chamfers 14C, 24C.

It should particularly be noted that, in this step S104, while the inner circumferential wall 14 and the outer circumferential wall 24, which constitute the first joining section 4, contact each other, the projection 15 and the step 25, which constitute the second joining section 5, separate from each other by a specified distance G1. For this reason, at this time point, a pressure by the pressure device 35 and the Joule heat generated by the current are only applied to the portions constituting the first joining section 4, and any energy is not supplied to the second joining section 5. A reason for intentionally changing joining timing of the two joining sites just as described is that, if the joining timing of the first joining section 4 and that of the second joining section 5 are simultaneously started, the energy (per unit volume) generated to the two joining sites does not become uniform, naturally, due to differences of positions, contact areas, and the like of the joining sites, and thus a burr or a spatter (dust) is possibly produced at the joining site supplied with a larger amount of the energy. In the present disclosure, as a purpose of suppressing such production of the spatter, the joining timing of the two joining sections is intentionally made different, mainly to adjust the energy amount to be supplied to each of the joining sections. The distance G1 of a clearance between the projection 15 and the step 25 can be about 1.0 to 3.0 mm, for example.

In relation to the adjustment of the energy to be supplied to the above-described joining sections, the lap allowance L1 of the first joining section 4 according to this embodiment is preferably larger than the joint width L2 of the second joining section 5. This is because, while the first joining section 4, joining of which is started earlier, serves as a portion that ensures strength of a joined portion in the joining apparatus 1, and thus high joint strength is requested, the second joining section 5, joining of which is started later, is intended to reinforce the strength at the time when bending stress in a thrust direction, and thus the relatively low joint strength is requested. In addition, this is because, in the case where the joint width L2 of the second joining section 5 is increased more than necessary (for example, to substantially the same length as the lap allowance L1 of the first joining section 4), the large pressure and the large energization amount are required to join this section, and the higher Joule heat than necessary is generated to the first joining section 4, joining of which is started earlier, at the time of joining of this section, which possibly produces the spatter.

Referring back to FIG. 5, in the case where the energization between the electrodes 31, 32 is started in step S104, and the pressure device 35 continuously moves the second metal member 20, the small diameter section 22 of the second metal member 20 is pressed into the first opening 12 of the first metal member 10. In addition, since the pulsed current is supplied between both of the metal members 10, 20, this pressure and the current are concentrated on contact surfaces of the inner circumferential wall 14 and the outer circumferential wall 24 of the first joining section 4. Then, these contact surfaces and vicinity thereof are heated and softened by the Joule heat, which is generated by the supplied current. As a result, while both of the contact surfaces plastically flow due to the pressure, joining of the solid-state surfaces progresses. At this time, a current value of the energization device 34 is preferably controlled such that the Joule heat, which is generated by the current, heats the first metal member 10 and the second metal member 20 to a temperature that is equal to or higher than the softening temperature and lower than the melting-point temperature.

Figure 4C:
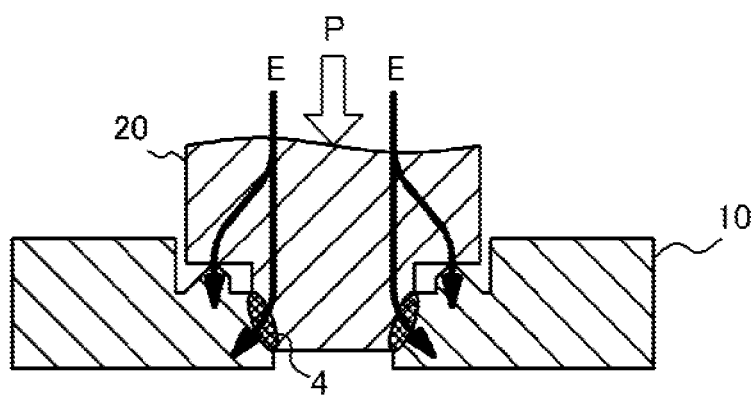
Figure 4D:
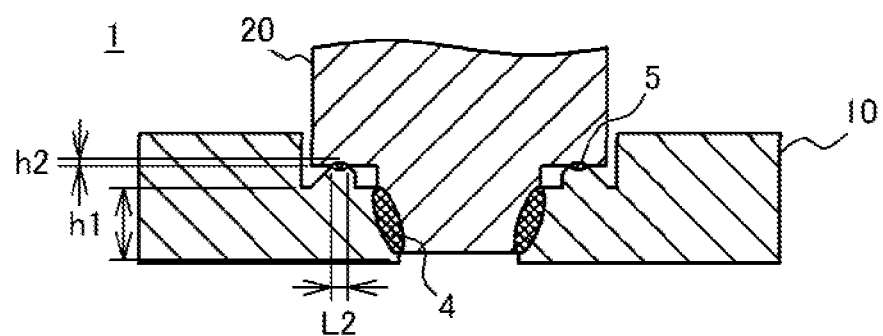

While joining of the first joining section 4 progresses as described above, the pressure device 35 keeps moving. Then, in step S105, when the projection 15 of the first metal member 10 and the step 25 of the second metal member 20 are brought into a second state of contacting each other, as illustrated in FIG. 4C, the current E also flows (that is, splits) into a contact portion between the projection 15 and the step 25, in detail, between an upper side of the projection 15 and a part of the step 25 opposing this upper side.

It should particularly be noted that, in this step S105, the projection 15 and the step 25, which constitute the second joining section 5, are located on an outer side of the inner circumferential wall 14 and the outer circumferential wall 24, which constitute the first joining section 4. In general, it has been known that, when the AC current is supplied to a member, current density tends to be higher on an outer side of the member than on an inner side of the member (a so-called skin effect). Accordingly, as in this embodiment, when the joining section, joining of which is started later, (that is, the second joining section 5) is disposed outside and the current is supplied in the contact states of both of the first and second joining sections 4, 5, a large amount of the current flows to the second joining section 5, and thus a relatively large amount of the energy can be supplied to the second joining section 5. In the case where the energy can smoothly be supplied to the joining section, joining of which starts later, just as described, the joint state of the second joining section 5 can easily match the joint state of the first joining section 4 after termination of the series of joining steps, and the spatter, which tends to occur in the first joining section 4, can effectively be suppressed.

In the case where the movement of the second metal member 20 continues by the pressure device 35 in the state where the current E partially flows onto the contact surface between the projection 15 and the step 25 as described above, the upper side constituting a tip of the projection 15 is pressurized to be crushed by the step 25, and the current E is partially supplied to this crushed portion. Accordingly, similar to the contact surface in the first joining section 4 and the vicinity thereof, this contact surface and vicinity thereof are heated and softened by the Joule heat, which is generated by the supplied current. Then, while a part of this softened projection 15 plastically flows in a direction orthogonal to the insertion direction by the pressure, joining of the solid-state surfaces progresses.

In the case where the movement by the pressure device 35 further progresses in the state where joining of the first joining section 4 and joining of the second joining section 5 described above progress, and lengths (also referred to as joint lengths) h1, h2 of the joining sections in the insertion direction of the joining sections 4, 5 reach desired lengths, completion of joining of both of the joining sections 4, 5 is determined (Yes in step S106), and the series of joining steps is completed. Here, the joint length h2 of the second joining section 5 equals a distance, for which the pressure device 35 moves the second metal member 20 in the insertion direction from the state where the projection 15 and the step 25 contact each other as illustrated in FIG. 4C to a joint completion state illustrated in FIG. 4D. In the method for manufacturing the joining apparatus 1 according to this embodiment, the joint length of each of the joining sections 4, 5, with which joining is completed, can be set to a relatively short length. More specifically, for example, the joint length h1 of the first joining section 4 can be set to 2.0 to 3.0 mm, and the joint length h2 of the second joining section 5 can be set to 0.2 to 0.6 mm. This is because the joining apparatus 1, which is manufactured through the above-mentioned joining steps, has the two joining sites, and thus the joint length at each of the joining site does not have to be long to improve the strength. Accordingly, in the method for manufacturing the joining apparatus 1 according to this embodiment, the joining work can be performed in a short period of time and with a saved amount of the energy. In addition, a length of a difference between the joint lengths h1, h2 equals a difference between the height H1 of the projection 15 from the step 16 and the height H2 of the small diameter section 22 from the step 25. Thus, the joint lengths h1, h2 can be adjusted by adjusting these heights H1, H2.

It should particularly be noted that above-described projection joining is adopted for the other joining section (in detail, the second joining section 5) in this embodiment. This is because the second joining section 5, for which projection joining is adopted, can be used as a stopper for the relative movement of the second metal member 20 in the insertion direction in the joining step. In general, it is assumed to adopt the following configuration in order to position the metal members in a joining direction during joining. In the configuration, one of the metal members is provided with a pin-shaped or pillar-shaped stopper piece that extends toward the other metal member, and when this stopper piece abuts the other metal member, joining is terminated. However, provision of such a stopper piece increases an amount of a required raw material and man-hours. Meanwhile, as in this embodiment, in the case where the joining section by projection joining is also used as the stopper, a stopper structure does not have to be provided separately, and thus the increase in the necessary raw material and man-hours can be suppressed. In addition, a joint area of the second joining section 5 is relatively small. Thus, for example, in the case where second energization is performed to temper the joining section after completion of the series of above-described joining steps, the energization amount to the first joining section 4 can relatively be increased, and thus tempering can be performed efficiently.

As it has been described so far, in the method for manufacturing the joining apparatus 1 according to this embodiment, the metal members are joined at the two joining sites of the first and second joining sections 4, 5. Thus, compared to a case where the only one joining site is provided, it is possible to manufacture the joining apparatus with the significant strength against the bending stress.

In addition, in this embodiment, as described above, the lengths of the lap allowance L1 and the joint width L2 and the position of the second joining section 5 are adjusted. In this way, the required joint strength for each of the joining sections and the energy amount supplied to each of the joining sections at the time of joining the first and second joining sections 4, 5 are adjusted. Therefore, both of the joining sections 4, 5 after the termination of the series of joining steps can be in favorable joint states with the simple adjustment.

In the above embodiment, it is exemplified that the second joining section 5 is constructed of the projection 15, which is provided in the first metal member 10, and the step 25, which is provided in the second metal member 20. However, the present disclosure is not limited thereto. In detail, for example, like a joining apparatus 1A illustrated in FIG. 6A, it may be configured that a projection 25' is formed in a second metal member 20' and a step 15' is formed in a first metal member 10'. Alternatively, for example, like a joining apparatus 1B illustrated in FIG. 6B, the projections 15, 25' that respectively abut the step 16 in the first metal member 10 and a step 26' in the second metal member 20' may be formed.

Second Embodiment

In the first embodiment described above, the description has been made on the case where, as the order of joining, joining of the first joining section 4, which is located on the inner side, is started first, and then joining of the second joining section 5, which is located on the outer side, is started. However, the present disclosure is not limited thereto. Thus, a description will hereinafter be made on, as a second embodiment of the present disclosure, an aspect in which the relative position between the first and second joining sections is changed. In the second embodiment, which will be described below, a specific description will not be made on the same components of a joining apparatus 1C as those of the joining apparatus 1, which has been described in the above first embodiment, and a description will primarily be made on different components from those of the joining apparatus 1.

FIG. 7 includes explanatory views, each of which schematically illustrates a state of main sections of first and second metal members in a respective step in a method for manufacturing a joining apparatus according to the second embodiment of the present disclosure. As illustrated in FIG. 7, the joining apparatus 1C according to this embodiment is constructed of a first metal member 40 and a second metal member 50.

The first metal member 40 is a gear-like member having a central portion in which a first opening 42 and a second opening 43 continue. The second opening 43 has a specified height H3 and has a larger diameter than this first opening 42. The first opening 42 and the second opening 43 continue via a step 45 that extends in a direction orthogonal to an axial direction of the first metal member 40. Furthermore, a chamfer 44C is provided between an inner circumferential wall 44, which defines the second opening 43, and a perpendicular surface to the axial direction of the first metal member 40.

The second metal member 50 is a shaft-like member having one end portion in which a columnar small diameter section 52 and a large diameter section 53 having a larger diameter than this small diameter section 52 continue. The small diameter section 52 and the large diameter section 53 continue via a step 56 that extends in a direction orthogonal to an axial direction of the second metal member 50. This step 56 is formed with a ring-shaped projection 55 that has a specified height H4 and is projected in the axial direction of the second metal member 50. Furthermore, a chamfer 54C is provided between an outer circumferential wall 54, which defines the large diameter section 53, and the step 56.

In the first and second metal members 40, 50 having the above-described configurations, the inner circumferential wall 44 of the first metal member 40 and the outer circumferential wall 54 of the second metal member 50 constitute a first joining section 4C, and the step 45 of the first metal member 40 and the projection 55 of the second metal member 50 constitute a second joining section 5C. The height H4 of the projection 55 is set to be shorter than the height H3 of the second opening 43. In this way, when the joining step is executed, the first joining section 4C, which is located on the relatively outer side, makes a contact prior to the second joining section 5C, which is located on the relatively inner side. Furthermore, a lap allowance L3 of the first joining section 4C is longer than a join width L4 of the second joining section 5C.

A method for manufacturing the joining apparatus 1C according to this embodiment has the same steps as those in the first embodiment. Thus, the description on each of the steps will be made with reference to the description of each of the steps in FIG. 5. A description will hereinafter be made on the method for manufacturing a joining apparatus according to this embodiment mainly with reference to FIG. 7 and FIG. 5. Also in the method for manufacturing a joining apparatus according to this embodiment, the manufacturing method with the series of manufacturing steps is implemented by using the manufacturing device 30, which has been described in the above first embodiment.

Figure 7A:
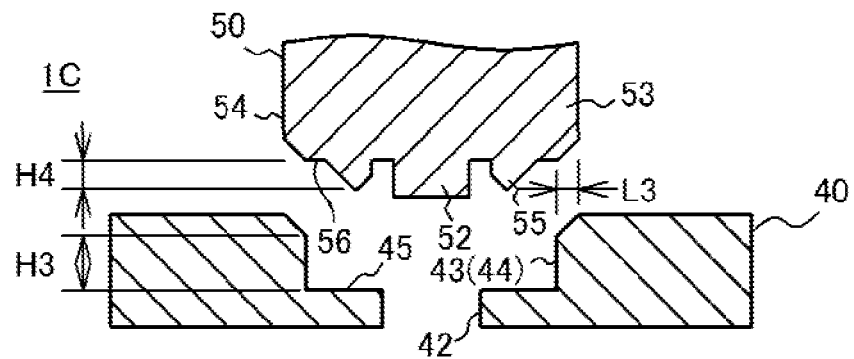
FIG. 7A to FIG. 7D show explanatory views, each of which schematically illustrates a state of main sections of first and second metal members in a respective step in an example of a method for manufacturing a joining apparatus according to a second embodiment of the present disclosure.

First, in step S101, as illustrated in FIG. 7A, the first metal member 40 and the second metal member 50 constituting the joining apparatus 1C are provided. Next, in step S102, the pressure device 35 (see FIG. 3) is actuated to cause the second metal member 50, which is fixed to the second electrode 32, to start moving.

Figure 7B:
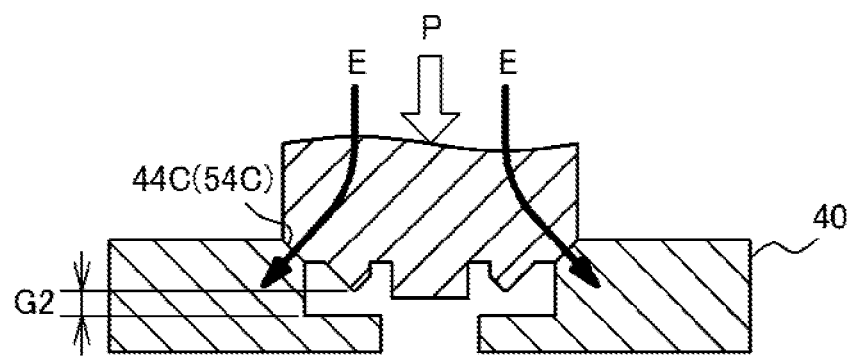

If the above-described movement continues, and, as illustrated in FIG. 7B, the inner circumferential wall 44 of the first metal member 40 and the outer circumferential wall 54 of the second metal member 50, which constitute the first joining section 4C, are brought into a first state of contacting each other (Yes in step S103), next, in step S104, the energization device 34, which is connected to the AC power supply 33, is actuated to supply the pulsed current between the first electrode 31 and the second electrode 32. Due to this energization, the current E, which is illustrated in FIG. 7B, flows between the first metal member 40 and the second metal member 50 via the abutting chamfers 44C, 54C. In this step S104, while the inner circumferential wall 44 and the outer circumferential wall 54, which constitute the first joining section 4C, contact each other, the step 45 and the projection 55, which constitute the second joining section 5C, separate from each other by a specified distance G2. For this reason, at this time point, the pressure by the pressure device 35 and the Joule heat generated by the current E, which is supplied from the energization device 34, are only applied to the portions constituting the first joining section 4C, and joining of the second joining section 5C is not started. The distance G2 of a clearance between the step 45 and the projection 55 can be about 1.0 to 3.0 mm, for example.

Figure 7C:
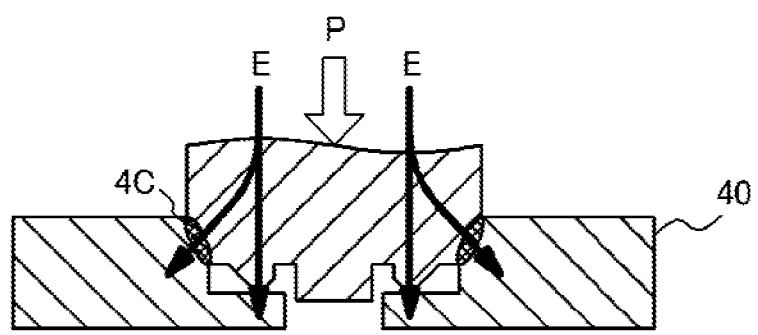
Figure 7D:
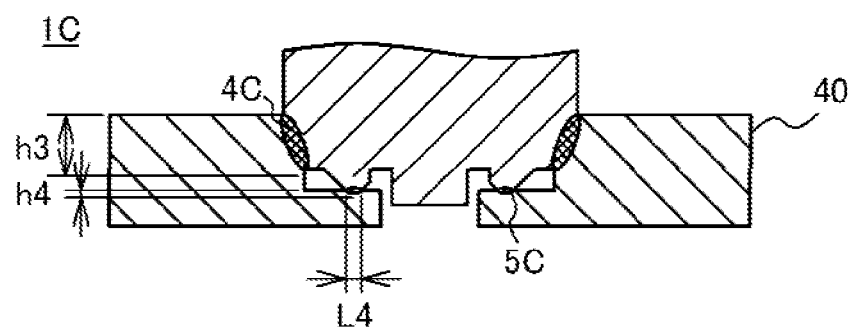

In the case where the energization between the electrodes 31, 32 is started in step S104, and the pressure device 35 continuously moves the second metal member 50, the large diameter section 53 of the second metal member 50 is pressed into the second opening 43 of the first metal member 40. In addition, since the pulsed current is supplied between both of the metal members 40, 50, this pressure and the current are concentrated on a contact surface between the inner circumferential wall 44 and the outer circumferential wall 54. Then, these contact surfaces and vicinity thereof are heated and softened by the Joule heat, which is generated by the supplied current. As a result, while both of the contact surfaces plastically flow due to the pressure, joining of the solid-state surfaces progresses. While joining of the first joining section 4C progresses as described above, the pressure device 35 keeps moving. Then, in step S105, when the step 45 of the first metal member 40 and the projection 55 of the second metal member 50 are brought into a second state of contacting each other, as illustrated in FIG. 7C, the current E also flows into a contact portion between the step 45 and the projection 55.

In the case where the movement of the second metal member 50 continues by the pressure device 35 in the state where the current E partially flows into the contact portion between the step 45 and the projection 55, a tip of the projection 55 is pressurized to be crushed by the step 45, and the current E is partially supplied to this crushed portion. Accordingly, similar to the contact surface in the first joining section 4C and the vicinity thereof, the contact surface in the second joining section 5C and vicinity thereof are heated and softened by the Joule heat, which is generated by the supplied current. Then, while a part of this softened projection 55 plastically flows in a direction orthogonal to the insertion direction by the pressure, joining of the solid-state surfaces progresses.

In the case where the movement by the pressure device 35 further progresses in the state where joining of the first joining section 4C and joining of the second joining section 5C described above progress, and lengths (also referred to as joint lengths) h3, h4 of the joining sections in the insertion direction of the joining sections 4C, 5C reach desired lengths (for example, 2.0 to 3.0 mm for h3, and 0.2 to 0.6 mm for h4), completion of joining of both of the joining sections 4C, 5C is determined (Yes in step S106), and the series of joining steps is completed. Here, the joint length h4 in the second joining section 5C equals a distance, for which the pressure device 35 moves the second metal member 50 in the insertion direction from the state where the projection 55 and the step 45 contact each other as illustrated in FIG. 7C to the joint completion state illustrated in FIG. 7D. In addition, a length of a difference between the joint lengths h3, h4 equals a difference between the height H3 of the second opening 43 from the step 45 and the height H4 of the projection 55 from the step 56. Thus, the joint lengths h3, h4 can be adjusted by adjusting these heights H3, H4.

Also in the above-described second embodiment, the metal members are joined at the two joining sites of the first and second joining sections 4C, 5C. Thus, compared to the case where the only one joining site is provided, it is possible to manufacture the joining apparatus with the significant strength against the bending stress. In addition, by adjusting the lap allowance L3 and the joint width L4 of the joining sections 4C, 5C, it is possible to adjust the joint strength requested for each of the joining sections 4C, 5C at the time of joining the first and second joining sections 4C, 5C. Therefore, both of the joining sections 4C, 5C after the termination of the series of joining steps can be in the favorable joint states with the simple adjustment.

Third Embodiment

In the first and second embodiments described above, the description has been made on the case where, as the order of joining, joining of the first joining sections 4, 4C, for which the Ring Mash joining is adopted, is started first, and then joining of the second joining sections 5, 5C, for which projection joining is adopted, is started. However, the present disclosure is not limited thereto. Thus, a description will hereinafter be made on, as a third embodiment of the present disclosure, an aspect in which the order of joining is changed. In the third embodiment, which will be described below, a specific description will not be made on the same components of a joining apparatus 1D as those of the joining apparatus 1, which has been described in the above first embodiment, and a description will primarily be made on different components from those of the joining apparatus 1.

FIG. 8 includes explanatory views, each of which schematically illustrates a state of main sections of first and second metal members 60, 70 in a respective step in a method for manufacturing the joining apparatus 1D according to the third embodiment of the present disclosure. As illustrated in FIG. 8, the joining apparatus 1D according to this embodiment is constructed of the first metal member 60 and the second metal member 70.

The first metal member 60 is a gear-like member having a central portion in which a first opening 62 and a second opening 63 continue. The second opening 63 has a larger diameter than this first opening 62. The first opening 62 and the second opening 63 continue via a step 66 that extends in a direction orthogonal to an axial direction of the first metal member 60. A portion where this step 66 and the first opening 62 continue constitutes a projection 65. Furthermore, a chamfer 64C is provided between an inner circumferential wall 64, which defines the second opening 63, and a perpendicular surface to the axial direction of the first metal member 60.

The second metal member 70 is a shaft-like member having one end portion constructed of a tapered surface 72 at a specified angle. A columnar outer circumferential wall 74 is provided to continue to a base side of this tapered surface 72, and a part of a tip of the tapered surface 72 constitutes an inclined surface 75.

In the first and second metal members 60, 70 having the above-described configurations, the inner circumferential wall 64 of the first metal member 60 and the outer circumferential wall 74 of the second metal member 70 constitute a first joining section 4D, and the projection 65 of the first metal member 60 and the inclined surface 75 of the second metal member 70 constitute a second joining section 5D. Furthermore, a joint width L5 of the second joining section 5D is longer than a lap allowance L6 of the first joining section 4D.

Figure 8A:
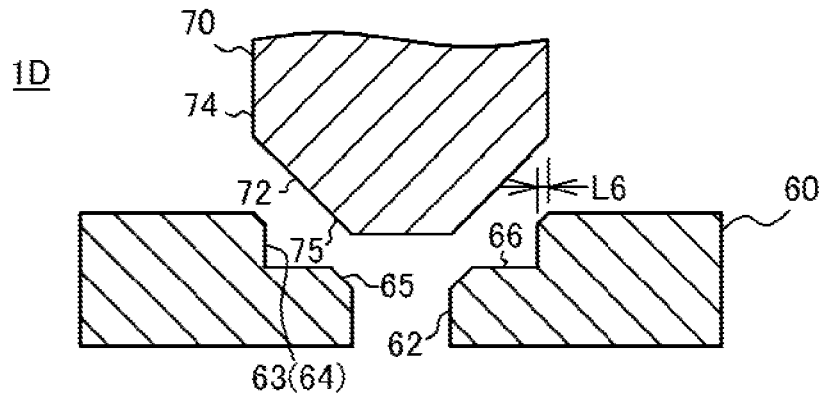
FIG. 8A to FIG. 8D show explanatory views, each of which schematically illustrates a state of main sections of first and second metal members in a respective step in an example of a method for manufacturing a joining apparatus according to a third embodiment of the present disclosure.
Figure 8B:
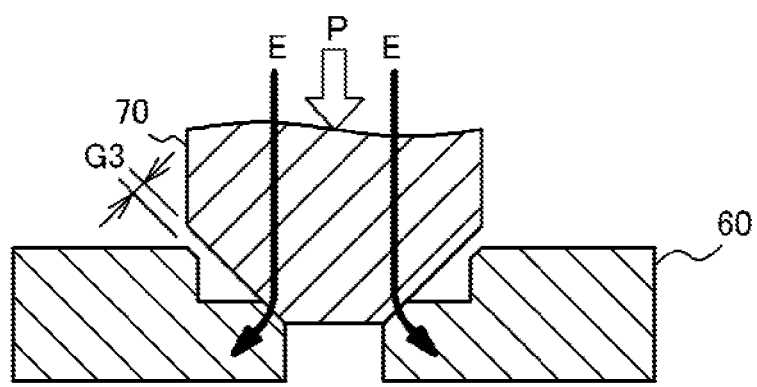
Figure 8C:
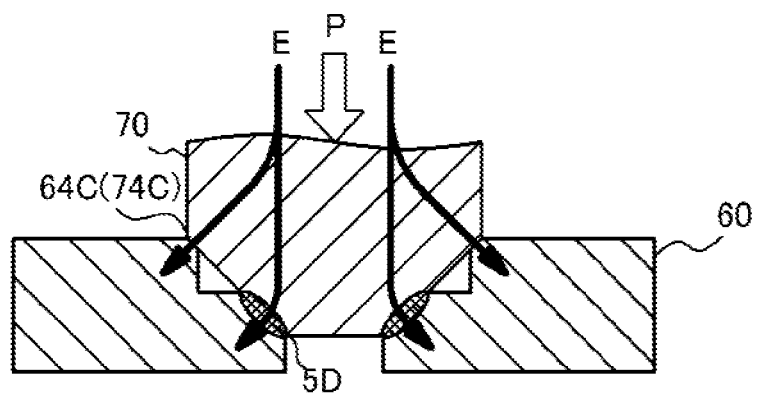
Figure 8D:
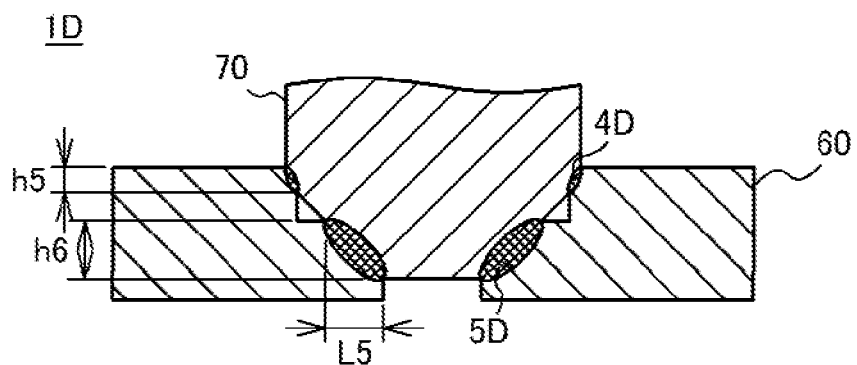
Figure 9:
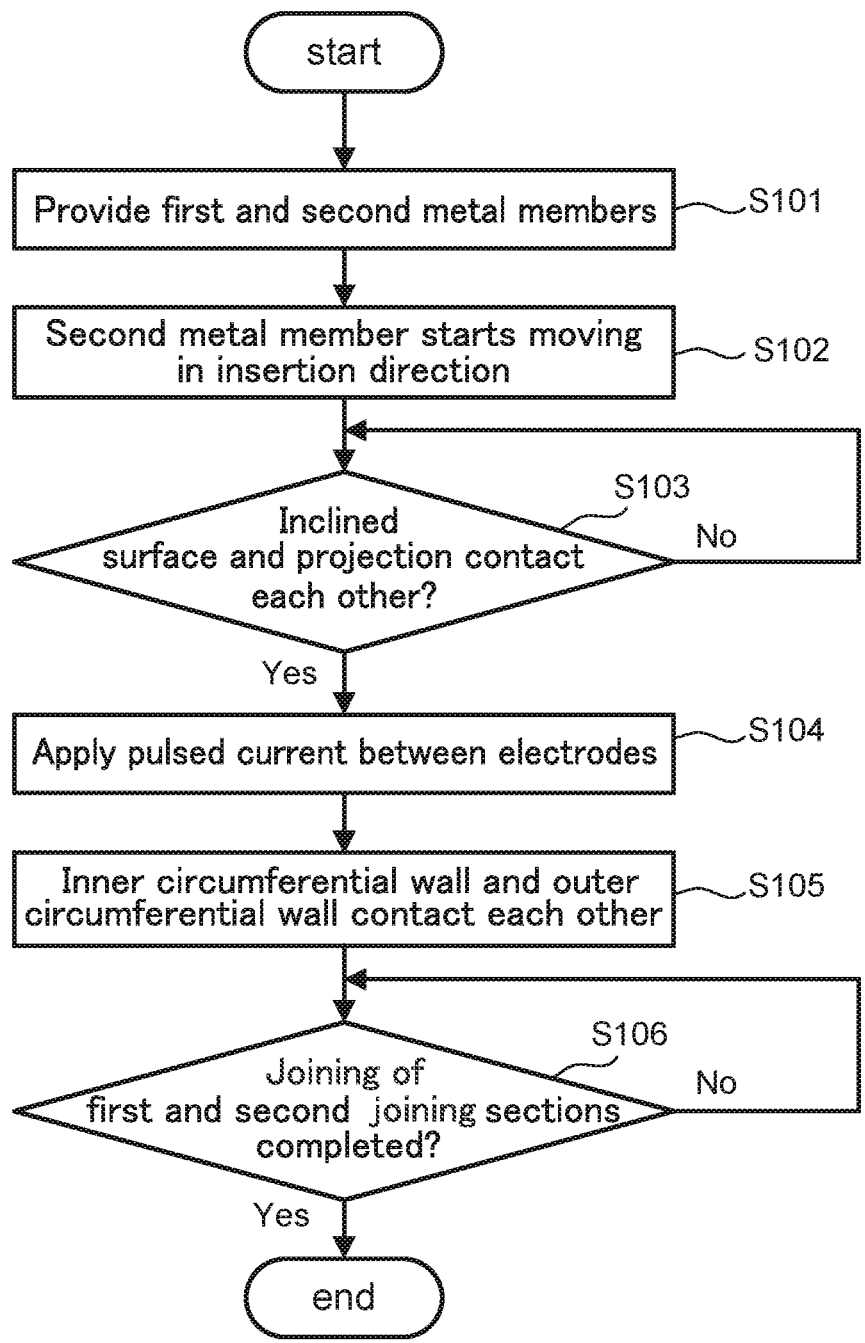
FIG. 9 shows a flowchart illustrating a method for manufacturing a joining apparatus according to the third embodiment of the present disclosure.

FIG. 9 is a flowchart illustrating the method for manufacturing the joining apparatus 1D according to the third embodiment of the present disclosure. A description will hereinafter be made on the method for manufacturing the joining apparatus 1D according to this embodiment mainly with reference to FIG. 8 and FIG. 9. Also in the method for manufacturing the joining apparatus 1D according to this embodiment, the manufacturing method with the series of manufacturing steps is implemented by using the manufacturing device 30, which has been described in the above first embodiment.

First, in step S101, as illustrated in FIG. 8A, the first metal member 60 and the second metal member 70 constituting the joining apparatus 1D are provided. Next, in step S102, the pressure device 35 is actuated to cause the second metal member 70, which is fixed to the second electrode 32, to start moving.

If the above-described movement continues, and, as illustrated in FIG. 8B, the projection 65 of the first metal member 60 and the inclined surface 75 of the second metal member 70, which constitute the second joining section 5D, are brought into the first state of contacting each other (Yes in step S103A), next, in step S104, the energization device 34, which is connected to the AC power supply 33, is actuated to supply the pulsed current between the first electrode 31 and the second electrode 32. Due to this energization, the current E, which is illustrated in FIG. 8B, flows between the first metal member 60 and the second metal member 70 via a tip of the projection 65 and the inclined surface 75, which abut each other. In this step S104, while the projection 65 and the inclined surface 75, which constitute the second joining section 5D, contact each other, the inner circumferential wall 64 and the outer circumferential wall 74, which constitute the first joining section 4D, separate from each other by a specified distance G3. For this reason, at this time point, the pressure by the pressure device 35 and the Joule heat generated by the current E, which is supplied from the energization device 34, are only applied to the portions constituting the second joining section 5D, and joining of the first joining section 4D is not started. The distance G3 of a clearance between the inner circumferential wall 64 and the outer circumferential wall 74 can be about 0.5 to 1.5 mm, for example.

In the case where the energization between the electrodes 31, 32 is started in step S104, and the pressure device 35 continuously moves the second metal member 70, the tip of the projection 65 is pressed and crushed by the inclined surface 75. In addition, since the pulsed current E is supplied to this portion, this pressure and the current are concentrated on a contact surface between the projection 65 and the inclined surface 75. Accordingly, the contact surface and vicinity thereof in this second joining section 5D are heated and softened by the Joule heat, which is generated by the supplied current. As a result, while the contact surface plastically flows due to the pressure, joining of the solid-state surfaces progresses. While joining of the second joining section 5D progresses as described above, the pressure device 35 keeps moving. Then, in step S105A, when the inner circumferential wall 64 of the first metal member 60 and the outer circumferential wall 74 of the second metal member 70 are brought into a second state of contacting each other, as illustrated in FIG. 8C, the current E also flows into a contact portion between the inner circumferential wall 64 and the outer circumferential wall 74.

In the case where the pressure device 35 continuously moves the second metal member 70 in a state where the current flows onto a contact surface between the chamfer 64C of the inner circumferential wall 64 and a chamfer 74C of the outer circumferential wall 74, the outer circumferential wall 74 of the second metal member 70 is pressed into the second opening 63 of the first metal member 60. Accordingly, the pressure and the current E are also supplied to the contact surface between the inner circumferential wall 64 and the outer circumferential wall 74. Thus, similar to the contact surface and vicinity thereof in the second joining section 5D, the contact surface and vicinity thereof in this first joining section 4D are heated and softened by the Joule heat, which is generated by the supplied current E. As a result, while the contact surface plastically flows due to the pressure, joining of the solid-state surfaces progresses.

In the case where the movement by the pressure device 35 further progresses in the state where joining of the first joining section 4D and joining of the second joining section 5D described above progress, and joint lengths h5, h6 in the insertion direction of the joining sections 4D, 5D reach desired lengths, completion of joining of both of the joining sections 4D, 5D is determined (Yes in step S106), and the series of joining steps is completed. As the joint length of each of the joining sections, with which joining is completed, for example, the joint length h5 of the first joining section 4D can be set to 1.0 to 2.0 mm, and the joint length h6 of the second joining section 5D can be set to 2.0 to 4.0 mm.

Also in the above-described third embodiment, the metal members are joined at the two joining sites of the first and second joining sections 4D, 5D. Thus, compared to the case where the only one joining site is provided, it is possible to manufacture the joining apparatus with the significant strength against the bending stress. In addition, by adjusting positions of both of the joining sections 4D, 5D, the required joint strength for each of the joining sections 4D, 5D and the energy amount supplied to each of the joining sections at the time of joining the first and second joining sections 4D, 5D are adjusted. Therefore, both of the joining sections 4D, 5D after the termination of the series of joining steps can be in favorable joint states with the simple adjustment.

Furthermore, in the above-described three embodiments, the lap allowance of the first joining section and the joint width of the second joining section are all set to different lengths. However, it is also possible to set each of the lap allowance and the joint width to the same length. In addition, in each of the above-described embodiments, the description has been made on the case where the solid phase joining, in detail, the Ring Mash joining and projection joining are adopted as the joining method. However, another joining method such as resistance welding associated with melting can also be partially or alternatively adopted.

The present disclosure is not limited to the above-described embodiments, and various modifications can be made thereto within the scope that does not depart from the gist of the present invention. All of those modifications are included in the technical idea of the present invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of manufacturing a joining apparatus, the method comprising:
   providing a first metal member comprising an opening and a joint structure;
   providing a second metal member comprising an outer circumferential wall capable of contacting an inner circumferential wall that surrounds the opening of the first metal member, and a joined structure to which the joint structure is joined, at least one of the joint structure or the joined structure being defined by one or a plurality of projections;
   causing the first metal member and the second metal member to move relative to each other in a direction of inserting the second metal member into the opening of the first metal member, bringing components of one joining section of a first joining section, which is defined by the inner circumferential wall and the outer circumferential wall, or a second joining section, which is defined by the joint structure and the joined structure, into contact with each other, and separating components of another joining section of the first joining section or the second joining section by a specified distance;
   starting energization between the first metal member and the second metal member;
   continuing the relative movement between the first metal member and the second metal member to bring the components of another joining section into contact with each other; and
   joining the first joining section and joining the second joining section by the relative movement and the energization.

2. The method of manufacturing a joining apparatus according to claim 1, wherein the joining is solid phase joining.

3. The method of manufacturing a joining apparatus according to claim 1, wherein the first joining section has a lap allowance of a specified length in which the inner circumferential wall and the outer circumferential wall overlap each other in a direction perpendicular to the direction of inserting, and the second joining section has a joint width of a specified length which extends in the direction perpendicular to the direction of inserting in a state in which the joint structure and the joined structure are joined, and the lap allowance or the joint width of the one joining section is longer than the joint width or the lap allowance of the other joining section.

4. The method of manufacturing a joining apparatus according to claim 1, wherein the one joining section is located further toward an inner side in a direction orthogonal to the direction of inserting than the other joining section.

5. A device for manufacturing a joining apparatus, the device comprising:
   a first electrode, to which a first metal member comprising an opening and a joint structure is fixed;
   a second electrode, to which a second metal member is fixed, the second metal member comprising an outer circumferential wall and a joined structure, the outer circumferential wall capable of contacting an inner circumferential wall that surrounds the opening of the first metal member, the joint structure being joined to the joined structure, and at least one of the joined structure or the joint structure being defined by one or a plurality of projections;
   a current conversion device that supplies a current between the first electrode and the second electrode; and
   an actuation mechanism that causes the first electrode to move relative to the second electrode or the second electrode to move relative to the first electrode,
   wherein the actuation mechanism causes the first metal member and the second metal member to move relative to each other in a direction of inserting the second metal member into the opening of the first metal member, and joins the first metal member and the second metal member via a first state of bringing components of one joining section of a first joining section, which is defined by the inner circumferential wall and the outer circumferential wall, or a second joining section, which is defined by the joint structure and the joined structure, into contact with each other, and separating the components of another joining section of the first joining section or the second joining section by a specified distance, and via a second state of bringing the components of another joining section into contact with each other, and
   wherein the current conversion device starts supplying the current between the first metal member and the second metal member at a time of the first state.

* * * * *